Oct. 22, 1968   B. F. WILEY   3,407,384
ACOUSTICAL SIGNAL GENERATOR
Filed Aug. 22, 1966   2 Sheets-Sheet 1

INVENTOR
B. F. WILEY
BY Young & Quigg
ATTORNEYS

Oct. 22, 1968  B. F. WILEY  3,407,384
ACOUSTICAL SIGNAL GENERATOR
Filed Aug. 22, 1966                    2 Sheets-Sheet 2

INVENTOR
B. F. WILEY
BY Young & Quigg
ATTORNEYS

United States Patent Office 3,407,384
Patented Oct. 22, 1968

3,407,384
ACOUSTICAL SIGNAL GENERATOR
Bruce F. Wiley, Bartlesville, Okla., assignor to Phillips Petroleum Company, a corporation of Delaware
Filed Aug. 22, 1966, Ser. No. 574,185
5 Claims. (Cl. 340—10)

ABSTRACT OF THE DISCLOSURE

An acoustical signal generator is formed by a magnetostrictive member which is coupled to a piezoelectric member, such as by the use of a noncompressible fluid. A voltage is applied across the piezoelectric member, and circuit means are provided for discharging this voltage through a coil surrounding the magnetostrictive member such that composite movement of the two members serves to generate an acoustical signal.

---

This invention relates to acoustical signal generating. In one of its aspects it relates to an acoustical signal generator in which a piezoelectric element and a magnetostrictive element are used in combination to generate an improved acoustical signal.

A knowledge of the velocity of propagation of acoustical waves in earth formations is valuable in analyzing oil producing regions penetrated by wells and in making seismic surveys. These velocities can be measured by lowering an acoustical signal generator and one or more detectors into a well to make measurements at various depths. Signal generators for use in this manner should be capable of establishing sharply defined acoustical signals repetitively in order that a plurality of measurements can be made in a given well.

Overton, 2,878,886 discloses an acoustical well logging instrument in which a plurality of axially aligned piezoelectric elements are used to generate acoustical signals. Overton further discloses that magnetostrictive elements can be used in place of the piezoelectric elements to generate an acoustical signal.

I have now discovered that an improved acoustical signal can be generated by using a piezoelectric acoustical signal generating device in combination with a magnetostrictive signal generating device such that the expansion and/or signal generation of the piezoelectric device reinforces the expansion and/or signal generation of the magnetostrictive device.

By various aspects of this invention, one or more of the following, or other, objects can be obtained.

It is an object of this invention to provide a novel acoustical signal generating method and apparatus.

It is a further object of this invention to provide an acoustical signal generating device for generating an improved acoustical signal.

Other aspects, objects, and the several advantages of this invention are apparent to one skilled in the art from a study of this disclosure, the drawings, and the appended claims.

According to the invention, there is provided a signal generating device in which a piezoelectric element and a magnetostrictive element are so aligned that the expansion of the piezoelectric element will cause a physical movement of the magnetostrictive element and the two elements are so electrically connected such that the expansion of the piezoelectric member is substantially coincidental with and in the same direction as the expansion of the magnetostrictive element, this composite movement serving to produce an acoustical signal.

In one embodiment, the magnetostrictive element and the piezoelectric element are cylindrical in shape and the piezoelectric element fits within the magnetostrictive element.

In another embodiment, the two elements are coupled by a non-compressible fluid.

In still another embodiment, electrical energy stored in the piezoelectric device is discharged through the magnetostrictive device to thereby cause a substantially simultaneous expansion of both elements.

Figure 1:
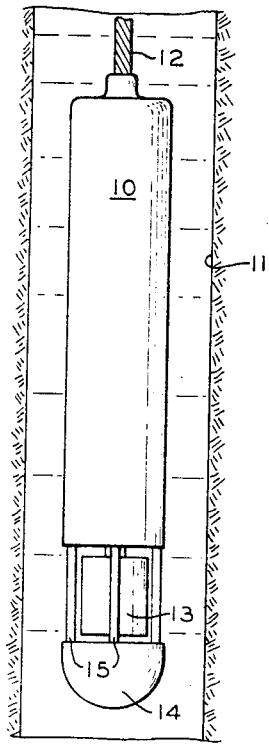
Figure 4:
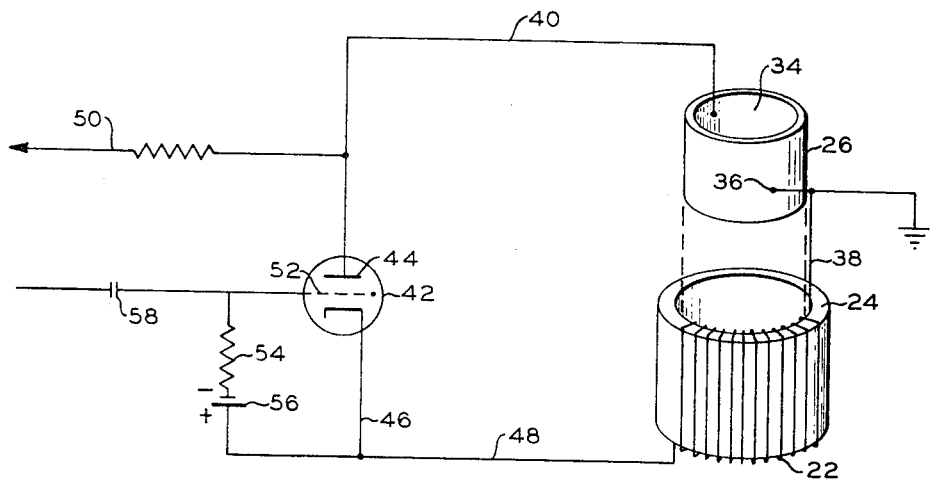
Figure 2:
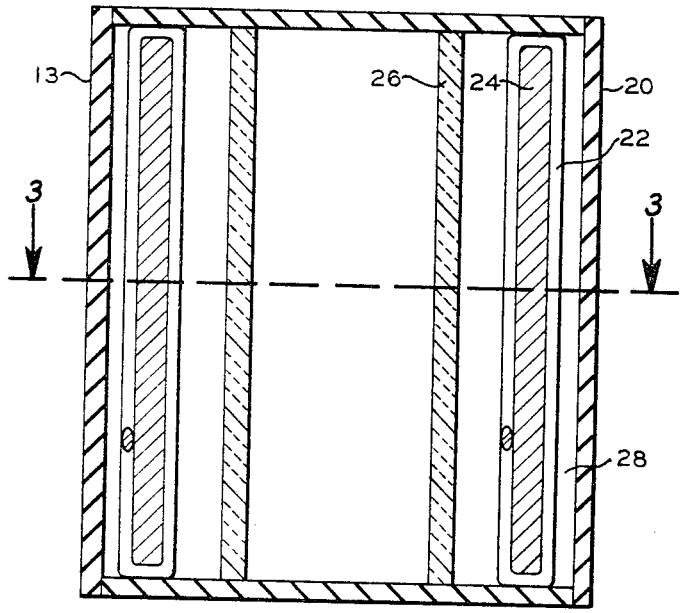
Figure 3:
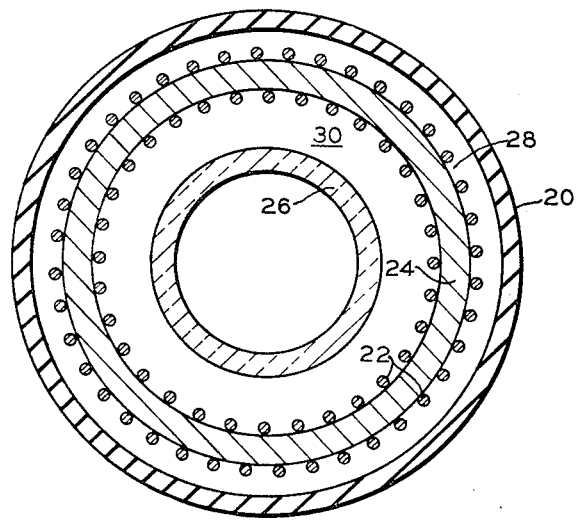

The invention will now be described with reference to the accompanying drawings in which FIGURE 1 is a schematic representation of the signal generator of this invention disposed in a bore hole; FIGURE 2 is a detailed view shown partially in section of the signal generator of FIGURE 1; FIGURE 3 is a view taken alone lines 3—3 of FIGURE 2; and FIGURE 4 is a schematic of a partial circuit of the electrical components associated with the signal generator of this invention.

Referring now to the drawings in detail and to FIGURE 1 in particular, there is shown a casing 10 which is suspended within a bore hole 11 by means of a cable 12. An acoustical signal generator 13 is suspended beneath casing 10, and a weight 14 is suspended beneath generator 13 by a plurality of rods 15. This weight aids in lowering the casing into the bore hole and protects the signal generator.

Signal generator 13 is illustrated in detail in FIGURES 2 and 3. An expandable casing 20 made of rubber or the like encloses the acoustical signal generator. The signal generator comprises a magnetostrictive core 24 which is wrapped with electrical coil 22 and has positioned within it a piezoelectric crystal in the shape of a cylinder 26. A space 30 between element 26 and element 24 is preferably provided with a noncompressible fluid such as oil so that the expansion of crystal 26 in a radial direction will be transmitted to element 24. An annular space 28 can be provided between casing 20 and element 24 and this space can also be filled with a noncompressible fluid.

The magnetostrictive element 24 can be any suitable magnetic material which exhibits magnetostrictive properties. A suitable material is iron and iron vanadium alloys. A particularly suitable magnetostrictive tubular element can be made from wrapping an oriented iron vanadium alloy strip into a cylindrical shape. Another suitable magnetostrictive device can be made from stacking together a plurality of annular magnetostrictive alloy plates.

The piezoelectric element can be any suitable transducer such as barium titanate or lead zirconium titanate.

Referring now to FIGURE 4 in detail, the coil 22 wrapped around magnetostrictive element 24 is connected to the piezoelectric element 26 by grounded lead 38 and electrode 36 which is coated on the outside of element 26. A second electrode 34 is coated on the inner portion of element 26 and is connected through lead 40 to the plate 44 of grid controlled gas tube 42 which can be a thyratron tube. Lead 40 is also connected to a high voltage supply 50. Cathode lead 46 of gas tube 42 is connected to lead 48 which in turn is connected to coil 22. A resistance 54 and battery 56 maintain a bias between grid 52 and lead 46, grid 56 being negative with respect to the cathode. An intermittent pulse is applied through a capacitor 58 to grid 52 to thereby trigger the circuit to actuate the magnetostrictive element and the piezoelectric element. A suitable triggering circuit is disclosed and claimed in application Ser. No. 216,566, filed Aug. 13, 1962, now Patent No. 3,258,741.

In operation, a high energy positive pulse is applied through capacitor 58 which causes current to flow through gas tube 42. The high voltage stored in 26 is caused to discharge through gas tube 42 and through leads 46, 48 and coil 22 to ground through lead 38. The flow of current from piezoelectric element 26 which is so aligned to expand as the current flows therefrom, causes element 26 to expand against element 24. Element 24 is magnetized and demagnetized and due to magnetostrictive forces, element 24 will expand radially at substantially the same time that element 26 expands. Thus, a positive pulse applied through capacitor 58 will simultaneously excite element 26 and element 24 to expand substantially in unison to thereby produce an acoustical signal which is due to the expansion of both element 26 and element 24. The combined output from both elements is a damped oscillation. The output can be further improved by selecting piezoelectric elements and magnetostrictive elements with like radial resonant frequencies.

Whereas the invention has been described with reference to a tubular piezoelectric and magnetostrictive element, it is within the scope of the invention to have other shapes of elements. For example, the signal generator could have a piezoelectric element axially aligned with the magnetostrictive element and the output would be along the composite axis. Or the piezoelectric and magnetostrictive elements could be in the form of plates which are positioned face-to-face to give an acoustical signal perpendicular to either plate.

Whereas the invention has been described with reference to the inventive signal generator, it is obvious that the signal generator can be used for generating signals in other applications such as above ground, or in underwater seismic exploration.

Reasonable variation and modification are possible within the scope of the foregoing disclosure, the drawings, and the claims to the invention without departing from the spirit thereof.

I claim:
1. An acoustical signal generating device comprising:
   (a) a magnetostrictive member and a coil positioned adjacent thereto so that passage of current through said coil establishes a magnetic field which causes a dimensional change in said magnetostrictive member,
   (b) a piezoelectric member spaced from and coupled to said magnetostrictive member by a noncompressible fluid, said piezoelectric member being aligned with said magnetostrictive member such that a dimensional change in said piezoelectric member will cause a physical movement in said magnetostrictive member, and
   (c) means for applying an electric pulse to said coil and said piezoelectric member such that the expansion of said piezoelectric member is substantially coincidental with and in the same direction as an expansion of said magnetostrictive member, the composite movement of said magnetostrictive member and said piezoelectric member serving to generate an acoustical signal.

2. An acoustical signal generating device according to claim 1 wherein said magnetostrictive member is cylindrically shaped and said piezoelectric member is cylindrically shaped, the piezoelectric member being within said magnetostrictive member and separated therefrom by said fluid.

3. An acoustical signal generating device comprising:
   (a) a magnetostrictive member and a coil positioned adjacent thereto so that passage of current through said coil establishes a magnetic field which causes a dimensional change in said magnetostrictive member,
   (b) a piezoelectric member aligned with said magnetostrictive member such that a dimensional change in said piezoelectric member will cause a physical movement of said magnetostrictive member, and
   (c) means for applying an electric pulse to said coil and said piezoelectric member such that the expansion of said piezoelectric member is substantially coincidental with and in the same direction as an expansion of said magnetostrictive member, the composite movement of said magnetostrictive member and said piezoelectric member serving to generate an acoustical signal, said means for applying an electric pulse comprising a high voltage source to charge said piezoelectric element, one terminal of said high voltage source being connected to a first electrode of said piezoelectric device, a gas tube biased between a grid and a cathode, an anode of said gas tube connected to said first electrode, means connecting one terminal of said coil to said gas tube cathode, said coil being grounded at the other end, means to ground a second electrode of said piezoelectric device, and trigger means connected to said gas tube grid to cause conduction through said gas tube to discharge energy in said piezoelectric device through said coil to thereby dimensionally change said magnetostrictive element.

4. An acoustical signal generating device comprising:
   (a) a magnetostrictive member and a coil positioned adjacent thereto so that passage of current through said coil establishes a magnetic field which causes a dimensional change in said magnetostrictive member,
   (b) a piezoelectric member aligned with said magnetostrictive member such that a dimensional change in said piezoelectric member will cause a physical movement of said magnetostrictive member, and
   (c) means for applying electrical signals to said coil and said piezoelectric member such that the expansion of said piezoelectric member is substantially coincidental with and in the same direction as an expansion of said magnetostrictive member, the composite movement of said magnetostrictive member and said piezoelectric member serving to generate an acoustical signal, said means for applying electrical signals comprising a voltage source applied across said piezoelectric member to charge same, and circuit means including an electrical switch connecting said piezoeletric member to said coil, whereby opening of said switch causes said piezoelectric member to discharge through said coil.

5. An acoustical signal generating device comprising:
   (a) a hollow cylindrical piezoelectric member,
   (b) a hollow cylindrical magnetostrictive member enclosing said piezoelectric member and spaced therefrom,
   (c) a coil enclosing said magnetostrictive member, and
   (d) a means forming a chamber between said piezoelectric member and said magnetostrictive member, said chamber being filled with a noncompressible fluid.

References Cited

UNITED STATES PATENTS

| | | |
|---|---|---|
| 1,451,422 | 4/1923 | Hahnemann. |
| 2,527,217 | 10/1950 | Hayes _____ 181—.5 |
| 2,834,943 | 5/1958 | Grisdale et al. |

BENJAMIN A. BORCHELT, *Primary Examiner.*

W. KUJAWA, *Assistant Examiner.*